US012128670B2

(12) United States Patent
Mizutani et al.

(10) Patent No.: US 12,128,670 B2
(45) Date of Patent: Oct. 29, 2024

(54) DRYING DEVICE AND PRINTING SYSTEM

(71) Applicant: SEIKO EPSON CORPORATION, Tokyo (JP)

(72) Inventors: Seigo Mizutani, Matsumoto (JP); Tsuneyuki Sasaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 97 days.

(21) Appl. No.: 18/048,950

(22) Filed: Oct. 24, 2022

(65) Prior Publication Data

US 2023/0127666 A1 Apr. 27, 2023

(30) Foreign Application Priority Data

Oct. 26, 2021 (JP) ................................ 2021-174699

(51) Int. Cl.
*B41J 11/00* (2006.01)

(52) U.S. Cl.
CPC ................................ *B41J 11/0022* (2021.01)

(58) Field of Classification Search
CPC .................................................. B41J 11/0022
See application file for complete search history.

(56) References Cited

U.S. PATENT DOCUMENTS

| | | | |
|---|---|---|---|
| 2017/0057257 A1 | 3/2017 | Nakano | |
| 2018/0229512 A1 | 8/2018 | Katagami | |

FOREIGN PATENT DOCUMENTS

| | | | | |
|---|---|---|---|---|
| EP | 2623328 | 8/2013 | | |
| EP | 2623328 A1 * | 8/2013 | .......... B41F 23/0443 | |
| JP | 2006-192780 A | 7/2006 | | |
| JP | 2019-069844 | 5/2019 | | |
| JP | 2019069844 A * | 5/2019 | | |
| JP | 2019155653 A * | 9/2019 | ........ B41J 11/00212 | |

* cited by examiner

*Primary Examiner* — Justin Seo
(74) *Attorney, Agent, or Firm* — WORKMAN NYDEGGER

(57) ABSTRACT

A drying device positioned between a printing apparatus that performs prints on a first surface of fabric transported in a transport direction, and a receiving device that receives the fabric after the fabric has passed through the printing apparatus, includes a blowing unit capable of blowing out gas to the first surface, and a suctioning unit positioned on a side close to a second surface side of the fabric in a blowing direction of the blowing unit, and capable of suctioning the gas. The blowing unit is configured to blow out gas in a state where the fabric is supported by respective support members in at least one of an upstream position and a downstream position of the blowing unit and the suctioning unit in a transport direction of the medium. Then a blowing direction of the gas faces downstream in the transport direction.

11 Claims, 3 Drawing Sheets

DRYING DEVICE AND PRINTING SYSTEM

The present application is based on, and claims priority from JP Application Serial Number 2021-174699, filed Oct. 26, 2021, the disclosure of which is hereby incorporated by reference herein in its entirety.

BACKGROUND

1. Technical Field

The present disclosure relates to a drying device that is positioned between a printing apparatus printing on fabric being transported, and a receiving device receiving the fabric after the fabric has passed through the printing apparatus, and that dries the fabric, and to a printing system.

2. Related Art

As an example of a printer such as an ink jet printing apparatus having such type of a drying device, a printer described in JP 2006-192780 A can be cited.

JP 2006-192780 A discloses a printer P that prints on a sheet-shaped recording medium M with ink containing a sublimation dye, to form an image. The printer P is provided with a loop forming unit L that forms a loop by the recording medium M, between a printing unit 4 and a winding unit R1, and a dryer H1 that causes ink on the recording medium M to dry, between the printing unit 4 and the loop forming unit L. The loop forming unit L includes a pair of transport rollers 5 that nip and support the recording medium M. The pair of transport rollers 5 are configured to form a slack part in the recording medium M. After nipping the recording medium M with the slack part formed, the transport rollers 5 are rotationally driven so as to have a transport speed synchronized with a transport mechanism 3, by a transmission mechanism (not illustrated) coupled to the transport mechanism 3.

When the recording medium is fabric, depending on a type of the fabric or a type of ink, it is not desirable to transport, by nipping with the pair of transport rollers, the fabric that is not yet subjected to drying treatment and onto which the ink is discharged and printing is performed, that is, an image is formed from a viewpoint of preventing deterioration in image quality, in some cases.

SUMMARY

In order to solve the problem described above, a drying device according to the present disclosure is a drying device that dries fabric between a printing apparatus performing printing on a first surface of the fabric and a receiving device receiving the fabric after the fabric has passed through the printing apparatus, the drying device including a blowing unit capable of blowing out gas to the first surface, and a suctioning unit positioned on a side close to a second surface of the fabric in a blowing direction in which the gas is blown out from the blowing unit, and capable of suctioning the gas, wherein the blowing unit blows out the gas to the fabric in a state where the second surface is supported by a support member in at least one of an upstream position and a downstream position, the upstream position being a position upstream of the blowing unit and the suctioning unit in a transport direction in which the fabric is transported and the downstream position being a position downstream of the blowing unit and the suctioning unit in the transport direction, and the blowing direction of the gas faces downstream in the transport direction.

In addition, a printing system according to the present disclosure includes a printing apparatus printing on a first surface of fabric, a drying device drying the fabric after passing through the printing apparatus, and a receiving device receiving the fabric after the fabric has passed through the drying device, wherein the drying device includes a blowing unit capable of blowing out gas to the first surface, and a suctioning unit positioned on side close to a second surface of the fabric in a blowing direction in which the gas is blown out from the blowing unit, and capable of suctioning the gas, the blowing unit blows out the gas to the fabric in a state where the second surface is supported by a support member in at least one of an upstream position and a downstream position, the upstream position being a position upstream of the blowing unit and the suctioning unit in a transport direction in which the fabric is transported and the downstream position being a position downstream of the blowing unit and the suctioning unit in the transport direction, and the blowing direction of the gas faces downstream in the transport direction.

DESCRIPTION OF EXEMPLARY EMBODIMENTS

Figure 1:
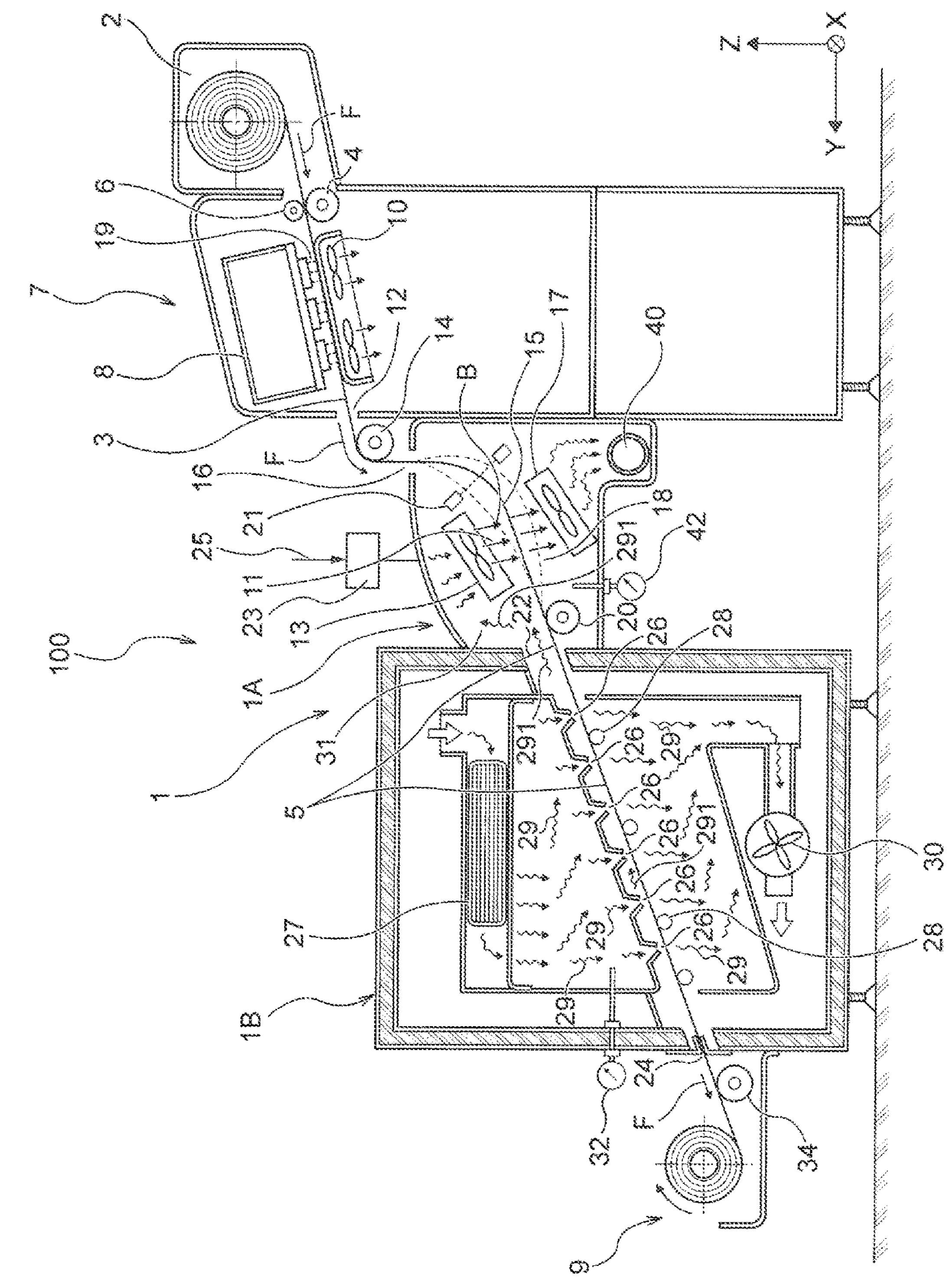
FIG. 1 is a schematic side cross-sectional view of a printing system according to an exemplary embodiment of the present disclosure.

Hereinafter, the present disclosure will be schematically described first.

In order to solve the problem described above, a drying device according to a first aspect of the present disclosure is a drying device that dries fabric between a printing apparatus printing on a first surface of the fabric and a receiving device receiving the fabric after passing through the printing apparatus, the drying device including a blowing unit capable of blowing gas (hot blast) to the first surface, and a suctioning unit positioned on a second surface side of the fabric in a blowing direction in which the gas is blown from the blowing unit, and capable of suctioning the gas, wherein the blowing unit blows the gas to the fabric in a state where the second surface is supported by a support member in at least one of an upstream position and a downstream position, the upstream position being a position upstream of the blowing unit and the suctioning unit in a transport direction in which the fabric is transported and the downstream position being a position downstream of the blowing unit and the suctioning unit in the transport direction, and the blowing direction of the gas faces downstream in the transport direction.

Here, “the downstream side in the transport direction” in “the blowing direction of the gas faces downstream in the transport direction” is used in the present specification in a sense that the blowing direction of the gas has a component heading downstream in the transport direction, that is, the gas is blown diagonally to the first surface of the fabric to apply transport force.

According to the present aspect, the blowing unit blows the gas to the first surface of the transported fabric, and the suctioning unit positioned on the second surface side of the fabric in the blowing direction of the blowing unit suctions the gas. In other words, in the fabric transported through a region between the blowing unit and the suctioning unit disposed at a predetermined interval, the first surface thereof receives blowing force due to the blowing of the gas from the blowing unit, and the second surface thereof receives suctioning force from the suctioning unit.

In addition, a part of the fabric that is present in the region is supported such that the second surface can be transported by respective support members at an upstream position and a downstream position in the transport direction of the blowing unit and the suctioning unit. In other words, the fabric is supported only at the two points of the region on the upstream side and the downstream side by the respective support members, and the part of the fabric present in the region is transported in a state of floating in a non-contact manner with surrounding members. Therefore, the part of the fabric present in the region has a curved shape in which the first surface is a concave surface and the second surface is a convex surface due to the blowing force and the suctioning force.

Here, to summarize the description, in the part present in the region between the blowing unit and the suctioning unit, the first surface receives the blown gas in a state of flowing in a non-contact manner with the surrounding members, and further the second face receives the suctioning force, and thus the fabric has the curved shape. This allows the gas blown to easily flow through grain from the first surface side to the second surface side of the fabric. Also, the gas that is blown and in contact with the fabric but does not pass through the fabric also receives suctioning force of the suctioning unit positioned on the second surface side and is suctioned. Accordingly, the fabric is subjected to the blowing and the suctioning of the gas and is effectively subjected to drying treatment.

Then, the blowing direction of the air faces downstream in the transport direction. That is, since the gas is obliquely blown to the first surface of the fabric, transport force is applied to the fabric.

As can be appreciated by the above description, according to the present aspect, the gas is blown obliquely to the first surface of the fabric, and the gas is suctioned from the second surface side of the fabric, and thus the fabric can be effectively subjected to the drying treatment in the state of flowing in a non-contact manner, and the transport force can be applied to the fabric at the same time. This makes it possible to suppress deterioration of image quality due to deformation during the transport of the fabric.

A drying device according to a second aspect of the present disclosure is the first aspect that includes a displacement detector 21 capable of detecting displacement of the fabric generated by at least one of blowing of the gas from the blowing unit and suctioning of the gas by the suctioning unit, and output of the blowing unit and output of the suctioning unit are controllable based on a detection result of the displacement detector.

Here, when a fan is used as the blowing unit, for example, "output of the blowing unit" refers to the number of rotations of the fan, a blowing amount per unit time, or the like. Further, when a fan is used as the suctioning unit, for example, "output of the suctioning unit" refers to the number of rotations of the fan, a suctioning amount per unit time, or the like.

According to the present aspect, even when the curved shape of the fabric changes in the region, the change in the curved shape can be suppressed and a predetermined curved shape can be maintained by controlling the output of the blowing unit and the output of the suctioning unit, based on a detection result of the displacement detector.

In addition, since the curved shape is created due to balance between the output of the blowing unit and the output of the suctioning unit, fluttering may occur in a part of the curved shape when the balance does not match a type of the fabric. For example, when grain of fabric is fine and the fabric is cloth difficult for gas to pass through, and when output of the blowing unit is excessive, a large part of the blown gas does not pass through the grain, and flows to both side end portions in a width direction of the fabric. Thus, fluttering may occur in both the side end portions. According to the present aspect, since the fluttering is detected by the displacement detector, the balance between the output of the blowing unit and the output of the suctioning unit can be adjusted to match the type of fabric, and the fabric can be brought into a state in which the fluttering does not occur.

Alternatively, it is also possible to further enhance drying efficiency of the fabric, by performing control, while causing the displacement detector to perform detection, such that a degree of curvature of the fabric repeatedly varies to increase or decrease, that is, the fabric is caused to vibrate in a direction intersecting a surface of the fabric.

A drying device according to a third aspect of the present disclosure is the first aspect or the second aspect, wherein at least one of output of the blowing unit and output of the suctioning unit is controllable based on information related to a type of the fabric.

According to the present aspect, at least one of the output of the blowing unit and the output of the suctioning unit is controllable based on the information related to the type of the fabric. This makes it possible to appropriately set the curved shape of the fabric depending on the type of fabric, for example, a thickness of the fabric, roughness of texture, and the like.

A drying device according to a fourth aspect of the present disclosure is the second aspect or the third aspect, wherein the blowing unit and the suctioning unit are controllable such that, based on information of a width dimension of the fabric, a blowing range of the gas blown from the blowing unit in the width direction, and a suctioning range of the gas suctioned by the suctioning unit in the width direction are smaller than the width dimension.

When the blowing range and the suctioning range are larger than a dimension of the fabric in the width direction, the gas from the blowing unit goes around from an end portion of the fabric in the width direction to the second surface side, causing fluttering in the end portion of the fabric, which is not desirable in some cases.

According to the present aspect, the blowing unit and the suctioning unit are controllable such that the blowing range and the suctioning range of the gas are smaller than the width dimension of the fabric in the width direction. As a result, it is possible to prevent the gas from the blowing unit from going around from the end portion of the fabric in the width direction to the second surface side, and thus the fluttering can be suppressed.

A drying device according to a fifth aspect of the present disclosure is any one of the first to fourth aspects, that includes a first drying chamber in which the blowing unit and the suctioning unit are accommodated, and a second drying chamber that communicates with the first drying chamber and in which the fabric after passing through the first drying chamber is introduced, and the second drying chamber is provided with a heating unit that heats the fabric.

According to the present aspect, the drying device includes the first drying chamber in which the blowing unit and the suctioning unit are accommodated, and the second drying chamber that further includes the heating unit, and to which the fabric after passing through the first drying chamber is introduced. The drying at the two stage facilitates drying of the fabric.

A drying device according to a sixth aspect of the present disclosure is the fifth aspect, wherein a part 291 of heated gases 29 that are created by the heating unit and heat a first surface 5 inside the second drying chamber is introduced into a region 31 on the blowing unit 13 side in the first drying chamber, and blown from the blowing unit 13.

According to the present aspect, the part 291 of the heated gases 29 that are created by the heating unit and heat the first surface 5 inside the second drying chamber is introduced into the region 31 on the blowing unit 13 side in the first drying chamber. As a result, the gas blown from the blowing unit is brought into a hot blast state, and thus drying performance in the first drying chamber can be improved.

A drying device according to a seventh aspect of the present disclosure is the sixth aspect, wherein in the second drying chamber, the fabric is transported in a state of being inclined from upstream to downstream in the transport direction, and the second drying chamber communicates with the first drying chamber upstream in the transport direction.

According to the present aspect, a part of the heated gas with which the heating unit heats the first surface inside the second drying chamber becomes a rising flow along the inclined surface of the fabric transported in the inclined state. The rising flow flows automatically into the first drying chamber, and thus the hot blast state of the gas blown from the blowing unit can be realized with simple structure.

A printing system according to an eighth aspect of the present disclosure includes a printing apparatus printing on a first surface of fabric transported in a transport direction, a drying device drying the fabric after passing through the printing apparatus, and a receiving device receiving the fabric after passing through the drying device, wherein the drying device is the drying device according to any one of the first to seventh aspects.

According to the present aspect, as a printing system, effects similar to those in any one of the first to eighth aspects can be obtained.

A printing system according to a ninth aspect of the present disclosure is the eighth aspect, wherein the printing apparatus prints on a first surface of the fabric using a composition containing pigment.

When a composition such as ink for printing is of a type containing pigment, unlike ink containing dye, a large amount of the pigment adheres to the first surface of the fabric. Therefore, when printing is performed with the ink containing the pigment, a problem of image quality deterioration is likely to occur when the fabric before drying treatment is nipped by a pair of transport rollers and transported, as compared to a case where printing is performed with ink containing dye.

According to the present aspect, transport force is applied to the fabric before drying treatment, by the blowing force and the suctioning force of the gas, and thus, the fabric can be transported without nipping by a pair of transport rollers as in the related art. In this way, even when ink is of a type containing pigment, the problem of image quality deterioration is not likely to occur.

Exemplary Embodiment

Hereinafter, a drying device according to an exemplary embodiment of the present disclosure and a printing system including the drying device will be described with reference to FIG. 1 and FIG. 2.

In the following description, three axes orthogonal to each other are denoted as an X-axis, a Y-axis, and a Z-axis, respectively, as illustrated in each of the figures. The Z-axis direction corresponds to a vertical direction (a direction in which gravity acts). The X-axis direction and the Y-axis direction correspond to horizontal directions.

As illustrated in FIG. 1, a printing system 100 of the present exemplary embodiment includes a printing apparatus 7 printing on the first surface 5 of fabric 3 transported in a transport direction F, a drying device 1 drying the fabric on which printing is performed through the printing apparatus 7, and a receiving device 9 receiving the fabric 3 after passing through the drying device 1.

Hereinafter, each component member will be described in detail.

Printing Apparatus

In the present exemplary embodiment, the printing apparatus 7 is an ink jet printer that can print on fabric. The printing apparatus 7 includes a printing head 8 and a platen 10. In a region between the printing head 8 and the platen 10, in a state where a second surface 15 of the fabric 3 is supported by the platen 10, a composition 19 such as ink is discharged from the printing head 8 onto the first surface 5 of the fabric 3, and printing is performed.

In the present exemplary embodiment, ink containing pigment is used as the composition 19. Of course, the composition 19 is not limited to ink containing pigment, and may be ink containing dye.

The fabric 3 is transported by receiving transport force by transport rollers including a pair of a driving roller 4 and a driven roller 6 positioned upstream the printing head 8.

The platen 10 here has structure in which the second surface 15 of the fabric 3 is suctioned to be in contact with a support surface facing the printing head 8 of the platen 10 for supporting by using suctioning force of a suction unit. The suctioning force is set to an extent that transport in the transport direction F of the fabric 3 is not hindered.

In the present exemplary embodiment, the fabric 3 wound in a roll shape is set in a feeding unit 2. The feeding unit 2 is controlled to feed the roll-shaped fabric 3 at the same speed as a feed speed of the driving roller 4. Here, the feeding unit 2 may feed the fabric 3 so that a slack part of the fabric 3 is created upstream the driving roller 4. By feeding the fabric in a state where the slack part is constantly present, the fabric need not be fed at the same speed as the feed speed of the driving roller 4, and thus the feeding is easily controlled.

Receiving Device

The receiving device 9 here is configured by a winding unit that winds, in a roll shape, fabric on which printing is performed and that is subjected to drying treatment. The receiving device 9 is controlled to wind the fabric 3 at the same speed as the feed speed of the driving roller 4.

Here, the receiving device 9 includes a guide roller 34 that is positioned immediately before a winding start position and supports the second surface 15 of the fabric 3 so as to be transportable. The receiving device 9 may wind the fabric 3 such that a slack part is created between the receiving device 9 and the guide roller 34. By winding the fabric 3 in a state where the slack part is constantly present, the fabric 3 need not be wound at the same speed as the feed speed of the driving roller 4, and thus the winding is easily controlled.

The guide roller 34 here is a rotatable driven roller, but may be a smooth guide or the like having small transport resistance.

Drying Device

As illustrated in FIG. 1, the drying device 1 is positioned between the printing apparatus 7 that prints on the first surface 5 of the fabric 3 transported in the transport direction F, and the receiving device 9 that receives the fabric after passing through the printing apparatus. Note that, the transport direction F of the fabric 3 in the printing apparatus 7, the transport direction F of the fabric 3 in the drying device 1, and the transport direction F of the fabric 3 in the receiving device 9 may be different from each other, or may be the same.

In the present exemplary embodiment, the drying device 1 includes the blowing unit 13 capable of blowing a gas 11 to the first surface 5, and a suctioning unit 17 that is positioned on the second surface 15 side of the fabric 3 in a blowing direction B in which the gas 11 is blown from the blowing unit 13, and capable of suctioning the gas 11. The blowing unit 13 is configured to blow the gas 11 to the fabric 3 in a state of being supported by a support member 14 at an upstream position and by a support member 20 at a downstream position of the blowing unit 13 and the suctioning unit 17 in the transport direction F in which the fabric 3 is transported in the drying device 1. Note that, one of the support member 14 and the support member 20 may be omitted. In other words, the fabric 3 may be supported by the support member 14 in at least one of the upstream position and the downstream position. The upstream position is a position upstream of the blowing unit 13 and the suctioning unit 13 in the transport direction F. The downstream position is a position downstream of the blowing unit 13 and the suctioning unit 13 in the transport direction F. The support member 14 supports the second surface 15 so as to be transportable, at the position upstream the blowing unit 13 and the suctioning unit 17 in the transport direction F. The support member 20 supports the second surface 15 so as to be transportable, at the position downstream the blowing unit 13 and the suctioning unit 17 in the transport direction F. Then, the blowing direction B of the gas 11 faces downstream in the transport direction F.

Here, "the downstream side in the transport direction F" in "the blowing direction B of the gas 11 faces downstream in the transport direction F" is used in the present specification in a sense that the blowing direction B of the gas 11 has a component heading downstream in the transport direction F, that is, the gas 11 is blown diagonally to the first surface 5 of the fabric 3 to apply transport force. A degree of the obliquity is set such that the transport force is appropriately applied depending on a type of the fabric 3.

In the present exemplary embodiment, the blowing unit 13 is configured by a fan capable of blowing the gas 11 as wind. As illustrated in FIG. 1, the suctioning unit 17 is positioned on the second surface 15 side of the fabric 3 at a predetermined interval from the blowing unit 13 in the blowing direction B of the gas 11. That is, the blowing unit 13 and the suctioning unit 17 are disposed so as to sandwich the fabric 3. The suctioning unit 17 is also configured by a fan capable of suctioning the gas 11.

In the fabric 3 transported through a region 18 between the blowing unit 13 and the suctioning unit 17 disposed at a predetermined interval, the first surface 5 thereof receives blowing force due to the gas 11 blown from the blowing unit 13, and the second surface 15 thereof receives suctioning force from the suctioning unit 17. A part of the fabric 3 that is present in the region 18 is supported by the support member 14 at an upstream position and the support member 20 at a downstream position in the transport direction F of the blowing unit 13 and the suctioning unit 17, such that the second surface 15 can be transported. That is, the fabric 3 is supported only at the two points on the upstream side and the downstream side of the region 18 by the respective support members 14 and 20, and the part of the fabric 3 present in the region 18 is transported in a state of floating in a non-contact manner with surrounding members.

Therefore, the part of the fabric 3 present in the region 18 has a curved shape in which the first surface 5 is a concave surface and the second surface 15 is a convex surface due to the blowing force and the suctioning force.

In the present exemplary embodiment, the blowing unit 13 and the suctioning unit 17 are configured such that output thereof can be adjusted to increase or decrease. That is, the output of the blowing unit 13 can be adjusted by changing the number of rotations of the fan, a blowing amount per unit time, and the like. Further, the output of the suctioning unit 17 can also be adjusted by changing the number of rotations of the fan and a suctioning amount per unit time, and the like.

The blowing unit 13 may be configured such that the blowing direction B of the gas 11 is variable. When the blowing unit 13 is configured such that the blowing direction B is variable, appropriate "obliquity" can be easily set depending on the type of the fabric 3. The blowing direction B may be modified by, for example, a louver window provided at a position where the gas 11 from the blowing unit 13 can pass, a mechanism capable of changing an orientation of the blowing unit 13 itself, or the like. When the suctioning unit 17 is also configured such that a suctioning direction is variable, it is possible to easily accommodate to a change in the blowing direction B of the blowing unit 13.

In the present exemplary embodiment, each of the support members 14 and 20 includes a driven roller, but may include a smooth guide or the like having small transport resistance.

The support member 14 at the upstream position here is provided outside the printing apparatus 7, and is provided at a discharge port 12 for the fabric 3. Also, the support member 20 at the downstream position is disposed inside the drying device 1. It is sufficient that the support members 14 and 20 can support the fabric 3 at the two points as described above, and thus the installation positions thereof are not limited to the positions described above.

Displacement Detector

Additionally, as illustrated in FIG. 1, in the present exemplary embodiment, the drying device 1 includes the displacement detector 21 capable of detecting displacement of the fabric 3 generated by at least one of the gas 11 blown from the blowing unit 13 and the gas 11 suctioned by the suctioning unit 17. When a position of the fabric 3 changes in the region 18 as indicated by dashed lines in FIG. 1, the displacement detector 21 detects the displacement. Then, a configuration is adopted in which output of the blowing unit 13 and output of the suctioning unit 17 can be controlled to increase or decrease based on a detection result of the displacement detector 21. As the displacement detector 21, a typical optical detector including a light emitting unit and a light receiving unit is used.

In the present exemplary embodiment, the drying device 1 includes a control unit 23, and the control unit 23 is configured to control output of the blowing unit 13 and output of the suctioning unit 17 based on a detection result of the displacement detector 21. Note that, a control unit included in the printing apparatus 7 may be used without providing the control unit 23 in the drying device 1. Alternatively, an external terminal such as a personal computer may be coupled, and the external terminal may be used as a control unit.

Additionally, in the present exemplary embodiment, at least one of output of the blowing unit 13 and output of the suctioning unit 17 is configured to be controllable based on information 25 related to the type of the fabric 3.

Here, as illustrated in FIG. 1, the control unit 23 is configured to receive the information 25 related to a type of the fabric 3, and control at least one of the output of the blowing unit 13 and the output of the suctioning unit 17 based on the received information 25 of the type of the fabric 3.

In FIG. 1, a reference numeral 16 denotes an introduction port for the fabric 3 after printing by the printing apparatus 7, and a reference numeral 400 denotes an exhausting unit that exhausts the gas 11 suctioned by the suctioning unit 17 to an outside, and a reference numeral 42 denotes a thermo-hygrometer.

Additionally, in the present exemplary embodiment, as illustrated in FIG. 1, the drying device 1 includes a first drying chamber 1A in which the blowing unit 13 and the suctioning unit 17 are accommodated, and a second drying chamber 1B that communicates with the first drying chamber 1A via a communication port 22, and to which the fabric 3 after passing through the first drying chamber 1A is introduced. A heating unit 27 that heats the fabric 3 is provided in the second drying chamber 1B. The fabric 3 is sent through the communication port 22 from an inside of the first drying chamber 1A to an inside of the second drying chamber 1B.

The drying device 1 may be configured only by the first drying chamber 1A, but from a viewpoint of promoting drying of the fabric 3, the configuration that also includes the second drying chamber 1B is desirable.

As illustrated in FIG. 1, in the second heating chamber 1B, from a plurality of slit-shaped openings 26, the heated gases 29 generated by heating air by the heating unit 27 are blown to the first surface 5 of the fabric 3 being transported. The fabric 3 receives the blown heated gases 29 from the openings 26 with the second surface 15 supported by a plurality of support rollers 28. At least one of the plurality of support rollers 28 is a rotatable driven roller. In the present exemplary embodiment, the plurality of support rollers 28 are disposed slightly shifted with respect to the plurality of openings 26 in the transport direction F. However, the disposition of the plurality of support rollers 28 is not limited to the present exemplary embodiment. For example, the plurality of support rollers 28 may face the plurality of openings 26 with the fabric 3 interposed therebetween. According to such disposition, a part of the heated gases 29 from the plurality of openings 26 passes through the grain of the fabric 3 and is blown to the plurality of support rollers 28. This makes it possible to further suppress fluttering of the fabric 3, as compared to a case where the heated gases 29 are blown to parts of the fabric 3 between the plurality of support rollers 28. Furthermore, the plurality of support rollers 28 are efficiently heated by heat contained in the heated gases 29 after passing through the grain of the fabric 3, and the second surface 15 of the fabric 3 can be heated.

A fan 30 for suctioning is provided on the second surface 15 side of the fabric 3, and suctioning force by the fan 30 acts on the second surface 15 of the fabric 3, and suctions the heated gases 29 used for drying treatment. The fan 30 is configured to discharge a part of the suctioned heated gases 29 into the second heating chamber 1B for cyclic usage, and the rest is released out of the chamber.

Additionally, in the present exemplary embodiment, a configuration is adopted in which, the part 291 of the heated gases 29 that are created by the heating unit 27 and heat the first surface 5 inside the second drying chamber 1B is introduced into the region 31 on the blowing unit 13 side in the first drying chamber 1A, and is blown from the blowing unit 13.

Furthermore, in the present exemplary embodiment, the plurality of support rollers 28 and the plurality of openings 26 are disposed in the second drying chamber 1B so as to transport the fabric 3 in an inclined state descending from upstream to downstream in the transport direction F. Then, the second drying chamber 1B communicates with the first drying chamber 1A at the communicating port 22 upstream in the transport direction F. the part 291 of the heated gases 29 becomes an ascending flow along the first surface 5 of the fabric 3 in the inclined state, and automatically flows into the region 31 on the blowing unit 13 side of the first drying chamber 1A from the communicating port 22.

In FIG. 1, a reference numeral 24 denotes a discharge port for the fabric 3, the second surface 15 of the fabric 3 after exiting the discharge port 24 is supported by the guide roller 34, and is wound in a roll shape by the receiving device 9. Also, a reference numeral 32 denotes a thermo-hygrometer.

Figure 2:
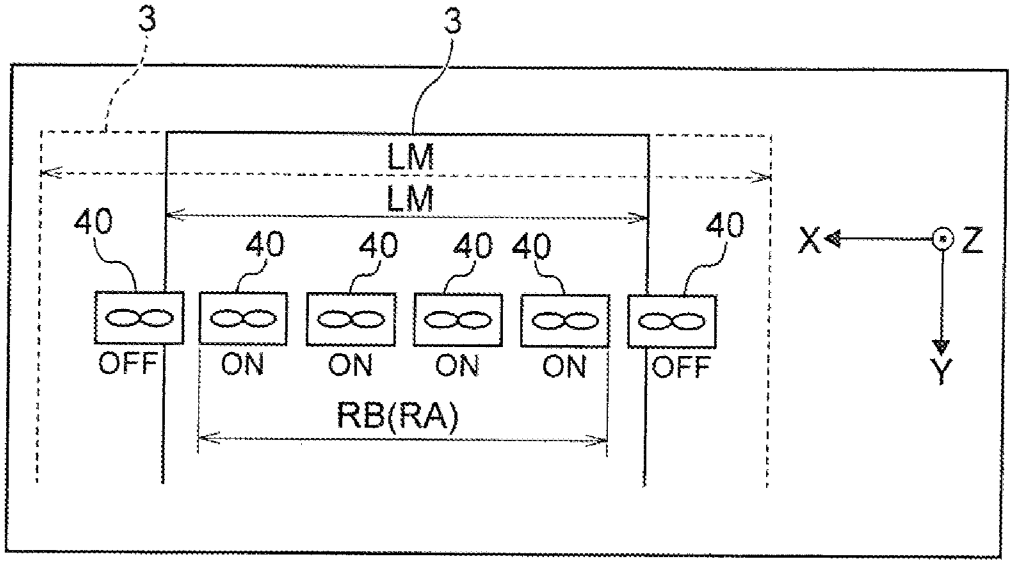
FIG. 2 is a schematic plan view of a drying device according to the exemplary embodiment.

Additionally, as illustrated in FIG. 2, in the present exemplary embodiment, the blowing unit 13 and the suctioning unit 17 are configured to be controllable such that, based on the information 25 of a width dimension LM of the fabric 3, a blowing range RB of the gas 11 blown from the blowing unit 13 in the width direction, and a suctioning range RA of the gas 11 suctioned by the suctioning unit 17 in the width direction are smaller than the width dimension LM. As the information 25 of the width dimension LM, by providing a width detection sensor, and the width dimension LM detected by the width detection sensor may be used, or a user may use the width dimension LM previously input.

The blowing unit 13 includes a plurality of fans 40, and the plurality of fans 40 are disposed at intervals in the width direction of the fabric 3. Note that, while not illustrated, the corresponding suctioning unit 17 includes a plurality of fans similarly, and the plurality of fans are disposed at intervals in the width direction of the fabric 3.

FIG. 2 illustrates a case where the fabric 3 is transported while a center position in the width direction of a transport path constituted by the platen 10 and the like is set to be aligned with a reference position. Since the fabric 3 is set to be aligned with the center position, a position of the fabric 3 can be recognized as long as information of the width dimension LM of the fabric 3 is obtained.

When the width dimension LM of the fabric 3 is large as indicated by a dashed line, the control unit 23 controls all the six fans 40 to be ON.

On the other hand, when the width dimension LM of the fabric 3 is small as indicated by a solid line, the control unit 23 controls the two fans 40 on both sides among the six fans 40 to be OFF, and the remaining four fans 40 to be ON. This allows the blowing range RB and the suctioning range RA to be smaller than the width dimension LM of the fabric 3.

Note that, even when the fabric 3 is transported while one side of the center in the width direction of the transport path constituted by the platen 10 and the like is set to be aligned with the reference position, the position of the fabric 3 can be recognized as long as the information of the width dimension LM of the fabric 3 is obtained, and thus control can be performed as in the case of the center position alignment.

Figure 3:
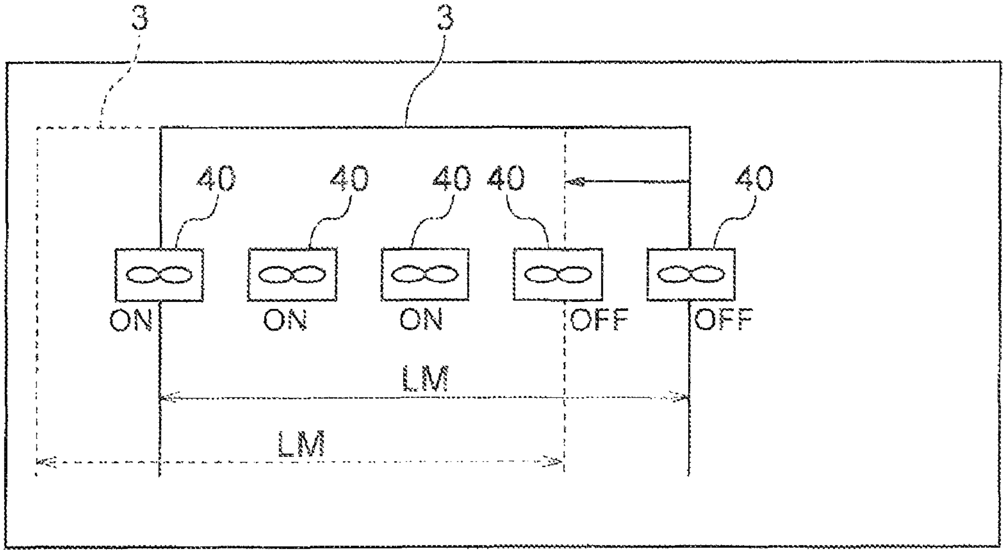
FIG. 3 is a schematic plan view of the drying device according to the exemplary embodiment.

FIG. 3 illustrates a case where the fabric 3 is transported while a position thereof is freely set in a width direction of a transport path constituted by the platen 10 and the like. In this case, in order to recognize a position of the set fabric 3, information related to the position is also required. As the information 25 related to the position, by providing a position sensor, the information 25 of the position detected by the position sensor may be used, or a user may be allowed to enter position information in advance.

When the position of the fabric 3 changes from a position indicated by a solid line to a position indicated by a dashed line, based on the width dimension LM and the position information, the control unit 23 controls the two fans 40 on a right side among the five fans 40 to be OFF, and the remaining three fans 40 to be ON. This allows the blowing range RB and the suctioning range RA to be smaller than the width dimension LM of the fabric 3.

Note that, when the fabric 3 is at the position indicated by the solid line, control is performed such that the two fans 40 on both sides among the five fans 40 are OFF, and the remaining three fans 40 are ON.

Description of Effects of Exemplary Embodiment (1) According to the present exemplary embodiment, the blowing unit 13 blows the gas 11 to the first surface 5 of the fabric 3 being transported, and the suctioning unit 17 positioned on the second surface 15 side of the fabric 3 in the blowing direction B of the blowing unit 13 suctions the gas 11. In other words, in the fabric 3 transported through the region 18 between the blowing unit 13 and the suctioning unit 17 disposed at a predetermined interval, the first surface 5 thereof receives blowing force due to the gas 11 blown from the blowing unit 13, and the second surface 15 thereof receives suctioning force from the suctioning unit 17.

In addition, a part of the fabric 3 that is present in the region 18 is supported by the support member 14 at an upstream position and the support member 20 at a downstream position in the transport direction F of the blowing unit 13 and the suctioning unit 17, such that the second surface 15 can be transported. In other words, the fabric 3 is supported only at the two points on the upstream side and the downstream side of the region 18 by the respective support members 14 and 20, and the part of the fabric 3 present in the region 18 is transported in a state of floating in a non-contact manner with surrounding members. Therefore, the part of the fabric 3 present in the region 18 has a curved shape in which the first surface 5 is a concave surface and the second surface 15 is a convex surface due to the blowing force and the suctioning force.

As can be seen from the above description, in a part present in the region 18 between the blowing unit 13 and the suctioning unit 17, the first surface 5 receives the blown gas 11 in a state of flowing in a non-contact manner with surrounding members, and further the second face 15 is subjected to suctioning force, and thus the fabric 3 has the curved shape. This allows the gas 11 blown to easily flow through the grain, from the first surface 5 side to the second surface 15 side of the fabric 3. Also, the gas 11 that is blown and in contact with the fabric 3 but does not pass through the fabric 3 also receives suctioning force of the suctioning unit 17 positioned on the second surface 15 side and is suctioned. Accordingly, the fabric 3 is subjected to the blowing and the suctioning of the gas 11 and is effectively subjected to drying treatment.

Then, the blowing direction B of the gas 11 faces downstream in the transport direction F. That is, since the gas 11 is obliquely blown to the first surface 5 of the fabric 3, transport force is applied to the fabric 3. As describe above, the gas 11 is blown obliquely to the first surface of the fabric 3, and the gas 11 is suctioned from the second surface 15 side of the fabric 3, and thus the fabric 3 can be effectively subjected to the drying treatment in a state where the fabric 3 is flowing in a non-contact manner, and the transport force can be applied to the fabric 3 at the same time. This makes it possible to suppress deterioration of image quality due to deformation during the transport of the fabric 3.

Here, when ink is of a type containing pigment, unlike ink containing dye, a large amount of the pigment adheres to the first surface 5 of the fabric 3. Therefore, when printing is performed with the ink containing the pigment, a problem of image quality deterioration is likely to occur when, for example, the fabric before drying treatment is nipped by a pair of transport rollers and transported, as compared to a case where printing is performed with ink containing dye.

Therefore, it is conceivable to perform transporting with a transporter having non-nip structure. For example, there is a case where a non-printed surface of the fabric 3 is attached to a belt which is given adhesiveness, and the fabric 3 is transported and subjected to drying treatment. However, when the fabric is pulled and peeled from the belt, cloth stretches and deforms significantly, and thus treatment may be necessary to modify the deformation in a subsequent process. Therefore, it is conceivable to reduce the adhesiveness so that the cloth do not stretch and deform when the fabric 3 is pulled and peeled from the belt. However, in this case, transport force for the fabric 3 cannot be sufficiently obtained, and stability in transport lowers.

In contrast, in the present exemplary embodiment, as described above, the blowing direction B of the gas 11 faces downstream in the transport direction F. As a result, even when the fabric 3 is transported in a state of flowing in a non-contact manner considering that the composition 19 is of a type containing pigment, transport force can be appropriately applied to the fabric 3.

(2) Additionally, in the present exemplary embodiment, even when the curved shape of the fabric 3 changes in the region 18, the change in the curved shape can be suppressed and a predetermined curved shape can be maintained by controlling output of the blowing unit 13 and output of the suctioning unit 17, based on a detection result of the displacement detector 21.

In addition, since the curved shape is created due to balance between the output of the blowing unit 13 and the output of the suctioning unit 17, fluttering may occur in a part of the curved shape when the balance does not match the type of the fabric 3. For example, when the grain of the fabric 3 is fine and the fabric 3 is cloth difficult for gas 11 to pass through, and when the output of the blowing unit 13 is excessive, a large part of the blown gas 11 does not pass through the grain of the fabric 3, and flows to both side end portions in a width direction of the fabric 3. Thus, fluttering may occur in both the side end portions.

According to the present exemplary embodiment, since the fluttering is detected by the displacement detector 21, the balance between the output of the blowing unit 13 and the output of the suctioning unit 17 can be adjusted to match the type of fabric 3, and the fabric 3 can be brought into a state in which the fluttering does not occur.

Alternatively, it is also possible to further enhance drying efficiency of the fabric 3, by performing control, while causing the displacement detector 21 to perform detection, such that a degree of curvature of the fabric 3 repeatedly varies to increase or decrease, that is, the fabric 3 is caused to vibrate in a direction intersecting a surface of the fabric 3.

(3) Additionally, in the present exemplary embodiment, at least one of output of the blowing unit 13 and output of the suctioning unit 17 is controllable based on the information 25 related to the type of the fabric 3. This makes it possible to appropriately set the curved shape of the fabric 3 depending on the type of fabric 3, for example a thickness of the fabric 3, roughness of texture, and the like.

(4) Further, when the blowing range RB and the suctioning range RA are larger than a dimension of the fabric 3 in a width direction, the gas 11 from the blowing unit 13 goes around from an end portion of the fabric 3 in the width direction to the second surface 15 side, causing fluttering in the end portion of the fabric 3, which is not desirable in some cases.

In the present exemplary embodiment, the blowing unit 13 and the suctioning unit 17 are controllable such that the blowing range RB and the suctioning range RA of the gas 11 are smaller than the width dimension LM of the fabric 3 in the width direction. As a result, it is possible to prevent the gas 11 from the blowing unit 13 from going around from the end portion of the fabric 3 in the width direction to the second surface 15 side, and thus the fluttering can be suppressed.

(5) Additionally, in the present exemplary embodiment, the drying device 1 includes the first drying chamber 1A in which the blowing unit 13 and the suctioning unit 17 are accommodated, and the second drying chamber 1B that further includes the heating unit 27 and to which the fabric 3 after passing through the first drying chamber 1A is introduced. The drying at the two stage facilitates drying of the fabric 3.

(6) Additionally, in the present exemplary embodiment, the part 291 of the heated gases 29 that are created by the heating unit 27 and heat the first surface 5 inside the second drying chamber 1B is introduced into the region 31 on the blowing unit 13 side in the first drying chamber 1A. As a result, the gas 11 blown from the blowing unit 13 is brought into a hot blast state, and thus drying performance in the first drying chamber 1A can be improved.

(7) Additionally, in the present exemplary embodiment, the part 291 of the heated gases 29 with which the heating unit 27 heats the first surface 5 inside the second drying chamber 1B becomes a rising flow along an inclined surface of the fabric 3 transported in an inclined state. The rising flow flows automatically into the first drying chamber 1A, and thus the hot blast state of the gas 11 blown from the blowing unit 13 can be realized with simple structure.

(8) Further, the printing system 100 of the present exemplary embodiment includes the drying device 1, and thus each of the effects described above can be obtained.

(9) In addition, in the present exemplary embodiment, the printing apparatus 7 prints on the first surface 5 of the fabric 3 with the composition 19 containing pigment. When the composition 19 such as ink for printing is of a type containing pigment, unlike ink containing dye, the pigment adheres to a surface of the fabric. Therefore, when printing is performed with the ink containing the pigment, a problem of image quality deterioration is likely to occur when the fabric 3 before drying treatment is nipped by a pair of transport rollers and transported, as compared to a case where printing is performed with ink containing dye.

According to the present exemplary embodiment, transport force is applied to the fabric 3 before drying treatment, by the blowing force and the suctioning force of the gas 11, and thus, the fabric can be transported without nipping by a pair of transport rollers as in the related art. In this way, even when ink is of a type containing pigment, the problem of image quality deterioration is not likely to occur.

Other Exemplary Embodiments

The drying device 1 and the printing system 100 according to the present disclosure are based on the configurations of the exemplary embodiment described above. However, as a matter of course, modifications, omission, and the like may be made to a partial configuration without departing from the gist of the disclosure of the present application.

The above drying device 1 is not limited to a combination with the ink jet printer of the above-described exemplary embodiment, and can be combined with, for example, a cloth cleaning device. Alternatively, a combination with a coating material application device is possible.

In addition, in FIG. 2, the structure has been described in which the blowing unit 13 and the suctioning unit 17 are controlled such that the blowing range RB and the suctioning section RA are smaller than the width dimension LM of the fabric 3 by switching ON and OFF of the plurality of fans 40, but the blowing range RB and the suctioning range RA may be adjusted using shutters.

What is claimed is:

1. A drying device that dries fabric between a printing apparatus and a receiving device, the printing apparatus being configured to perform printing on a first surface of the fabric, the receiving device being configured to receive the fabric after the fabric passes through the printing apparatus, the drying device comprising:

a blowing unit configured to blow out gas to the first surface;

a suctioning unit positioned on a second surface side of the fabric in a blowing direction in which the gas is blown out from the blowing unit, and configured to suction the gas;

a displacement detector configured to detect displacement, of the fabric, caused by at least one of blowing out the gas from the blowing unit or suctioning the gas by the suctioning unit, wherein the blowing unit blows out the gas to the fabric in a state where the second surface is supported by a support member in at least one of an upstream position and a downstream position, the upstream position being a position upstream of the blowing unit and the suctioning unit in a transport direction in which the fabric is transported and the downstream position being a position downstream of the blowing unit and the suctioning unit in the transport direction, the blowing direction of the gas is directed downstream in the transport direction, and output of the blowing unit and output of the suctioning unit are controllable based on a result of the detection by the displacement detector.

2. The drying device according to claim 1, wherein at least one of output of the blowing unit or output of the suctioning unit is controllable based on information related to a type of the fabric.

3. The drying device according to claim 1, wherein the blowing unit and the suctioning unit are controllable such that, based on information of a width dimension of the fabric, a blowing range of the gas blown out from the blowing unit in the width direction, and a suctioning range of the gas suctioned by the suctioning unit in the width direction are smaller than the width dimension.

4. The drying device according to claim 1, comprising:

a first drying chamber configured to accommodate the blowing unit and the suctioning unit; and a second drying chamber communicating with the first drying chamber, and into which the fabric after passing through the first drying chamber is introduced, wherein the second drying chamber is provided with a heating unit configured to heat the fabric.

5. The drying device according to claim 4, wherein a part of heated gas created by the heating unit inside the second drying chamber to heat the first surface is introduced into a region on a side close to the blowing unit in the first drying chamber, and is blown out from the blowing unit.

6. The drying device according to claim 5, wherein in the second drying chamber, the fabric is transported in an inclined state in which the fabric descends from upstream to downstream in the transport direction, and the second drying chamber communicates with the first drying chamber on the upstream in the transport direction.

7. A printing system, comprising:

a printing apparatus configured to perform printing on a first surface of a fabric;

a drying device configured to dry the fabric after the fabric passes through the printing apparatus; and a receiving device configured to receive the fabric after the fabric passes through the drying device, wherein the drying device includes a blowing unit configured to blow out gas to the first surface, a suctioning unit positioned on a second surface side of the fabric in a blowing direction in which the gas is blown out from the blowing unit, and configured to suction the gas, and a displacement detector configured to detect displacement, of the fabric, caused by at least one of blowing out the gas from the blowing unit or suctioning the gas by the suctioning unit, the blowing unit blows out the gas to the fabric in a state in which the second surface is supported by a support member in at least one of an upstream position and a downstream position, the upstream position being a position upstream of the blowing unit and the suctioning unit in a transport direction in which the fabric is transported and the downstream position being a position downstream of the blowing unit and the suctioning unit in the transport direction, the blowing direction of the gas is directed downstream in the transport direction, and output of the blowing unit and output of the suctioning unit are controllable based on a result of the detection by the displacement detector.

8. The printing system according to claim 7, wherein the printing apparatus performs printing, using a composition containing pigment, on a first surface of the fabric.

9. A drying device that dries fabric between a printing apparatus and a receiving device, the printing apparatus being configured to perform printing on a first surface of the fabric, the receiving device being configured to receive the fabric after the fabric passes through the printing apparatus, the drying device comprising:

a blowing unit configured to blow out gas to the first surface;

a suctioning unit positioned on a second surface side of the fabric in a blowing direction in which the gas is blown out from the blowing unit, and configured to suction the gas;

a first drying chamber configured to accommodate the blowing unit and the suctioning unit; and a second drying chamber communicating with the first drying chamber, and into which the fabric after passing through the first drying chamber is introduced, wherein the blowing unit blows out the gas to the fabric in a state where the second surface is supported by a support member in at least one of an upstream position and a downstream position, the upstream position being a position upstream of the blowing unit and the suctioning unit in a transport direction in which the fabric is transported and the downstream position being a position downstream of the blowing unit and the suctioning unit in the transport direction, the blowing direction of the gas is directed downstream in the transport direction, and the second drying chamber is provided with a heating unit configured to heat the fabric.

10. The drying device according to claim 9, wherein a part of heated gas created by the heating unit inside the second drying chamber to heat the first surface is introduced into a region on a side close to the blowing unit in the first drying chamber, and is blown out from the blowing unit.

11. The drying device according to claim 10, wherein in the second drying chamber, the fabric is transported in an inclined state in which the fabric descends from upstream to downstream in the transport direction, and the second drying chamber communicates with the first drying chamber on the upstream in the transport direction.

* * * * *